(12) United States Patent
Dooley

(10) Patent No.: US 6,511,111 B2
(45) Date of Patent: Jan. 28, 2003

(54) PET WASTE COLLECTION AND DISPOSAL GLOVE

(75) Inventor: Lorie Dooley, 1415 A St. NE., Washington, DC (US) 20002

(73) Assignees: Lorie Dooley, Waldorf, MD (US); Indira Bogans, Waldorf, MD (US); Carla Dunlap, Washington, DC (US)

( * ) Notice: Subject to any disclaimer, the term of this patent is extended or adjusted under 35 U.S.C. 154(b) by 0 days.

(21) Appl. No.: 09/828,118

(22) Filed: Apr. 9, 2001

(65) Prior Publication Data

US 2002/0043810 A1 Apr. 18, 2002

Related U.S. Application Data

(63) Continuation-in-part of application No. 09/686,081, filed on Oct. 12, 2000, now abandoned.
(60) Provisional application No. 60/158,360, filed on Oct. 12, 1999.

(51) Int. Cl.[7] .................. A01K 29/00; A41D 19/00
(52) U.S. Cl. .................. 294/1.3; 294/25; 2/159
(58) Field of Search .................. 294/1.3–1.5, 25; 2/16, 20, 158–160, 161.6, 161.7, 161.8, 168; 383/4; 15/104.8, 227

(56) References Cited

U.S. PATENT DOCUMENTS

| | | |
|---|---|---|
| 720,640 A | 2/1903 | Torrens |
| 1,329,073 A * | 1/1920 | Czicziriga .................. 2/159 |
| 2,054,559 A * | 9/1936 | Dunn .................. 15/227 |
| 4,645,251 A | 2/1987 | Jacobs |
| 4,677,697 A | 7/1987 | Hayes |
| 4,768,818 A | 9/1988 | Kolic |
| 4,788,733 A | 12/1988 | Lerner |
| 4,845,781 A | 7/1989 | Strickland et al. |
| 4,902,283 A | 2/1990 | Rojko et al. |
| 4,937,881 A | 7/1990 | Heise |
| 4,959,881 A | 10/1990 | Murray |
| 5,020,159 A | 6/1991 | Hellickson |
| 5,020,160 A | 6/1991 | Cano |
| 5,186,322 A | 2/1993 | Harreld et al. |
| 5,438,708 A | 8/1995 | Jacovitz |
| 5,704,670 A | 1/1998 | Surplus |
| 5,740,554 A | 4/1998 | Reed |
| 5,806,099 A | 9/1998 | Grinbeerg |
| 5,901,995 A | 5/1999 | Tuvim et al. |
| 5,961,167 A | 10/1999 | Gilley |
| 6,116,668 A * | 9/2000 | Carpol .................. 2/160 |
| 6,298,491 B1 * | 10/2001 | Blustin et al. .................. 2/161.6 |

FOREIGN PATENT DOCUMENTS

| | | |
|---|---|---|
| FR | 2637-924 A | 4/1990 |
| GB | 2 237 973 A | 5/1991 |
| WO | WO 90/00357 | 1/1990 |

* cited by examiner

*Primary Examiner*—Dean J. Kramer
(74) *Attorney, Agent, or Firm*—Richard C. Litman

(57) ABSTRACT

An improved glove-like device especially adapted to collect and dispose of pet waste, incorporating half-webbing between glove fingers, a full, thin padding in the palm and fingers area, and a tapered, extended-length cuff with ties at the outer cuff end. The cuff extends midway up the arm of the user. The entire device may be made of biodegradable material or materials. The palm padding may be bubble-wrap in structure, or made of non-woven or paper material, or of ribbed or ridged plastic; it blocks the warmth of the waste from being felt by the user's hand.

8 Claims, 6 Drawing Sheets

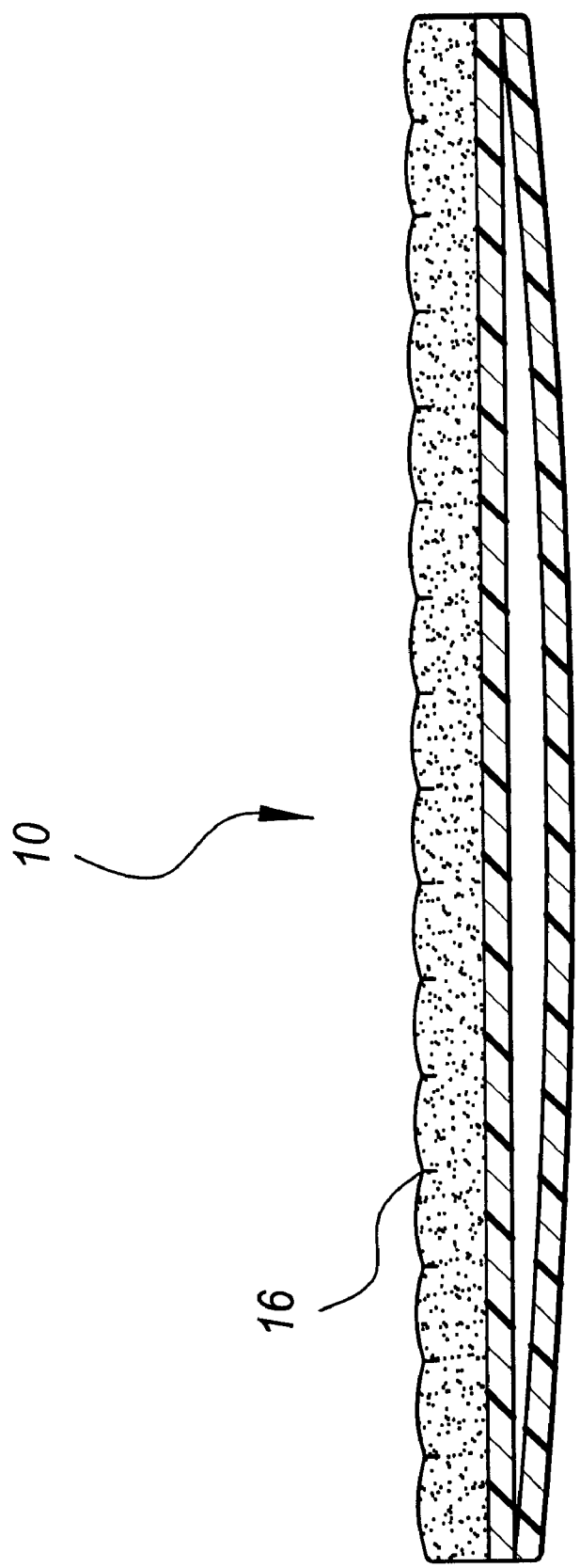

PET WASTE COLLECTION AND DISPOSAL GLOVE

CROSS-REFERENCE TO RELATED APPLICATIONS

This application claims the benefit of U.S. Provisional Patent Application Serial No. 60/158,360, filed Oct. 12, 1999. This is a continuation-in-part of application Ser. No. 09/686,081, filed Oct. 12, 2000 now abandoned.

BACKGROUND OF THE INVENTION

1. Field of the Invention

The present invention generally relates to waste disposal and, more specifically, to an improved glove-like device especially adapted to collect and dispose of pet waste, incorporating half-webbing between glove fingers, a full, thin padding in the palm and fingers area, and a tapered, extended-length cuff with ties at the outer cuff end.

2. Description of the Related Art

Pet waste on streets and walkways has become a health and aesthetic problem, especially in high-density urban areas. In recent years, the severity of the problem has prompted many municipalities to enact ordinances which require a pet owner to retrieve and properly dispose of pet waste or face a hefty fine. This is to say nothing of rat attraction caused by uncollected pet waste, and diseases than can be transmitted through flimsy related-art gloves, such diseases including tuberculosis, streptoccal, staphylococcal and other bacterial infections, all of which are preventable.

Many devices have appeared on the market to aid the pet owner in retrieving the pet waste. Among these devices are glove-like structures as disclosed in U.S. Pat. No. 4,645,251 (Jacobs), and U.S. Pat. No. 4,768,818 (Kolic). U.S. Pat. No. 5,438,708 (Jacovitz) discloses a fully webbed finger glove and an oversized collection pad attached by hook and loop fasteners, for collecting and disposing waste. The bulky pad and full webbing between the finger portions greatly restrict movement of the fingers, thumb and hand in collecting waste. Also, obviously the device is far too costly to mass-produce, when compared with the present invention. U.S. Pat. No. 5,740,670 (Surplus) teaches a glove and bag combination for collecting waste; after use, the glove part is inverted into the bag. Clearly, the half-webbing and padding features of the present invention are not taught in Surplus. U.S. Pat. No. 5,961,167 (Gilley) discloses a glove and bag combination for waste collection, including an absorbent layer. The device permits only limited finger and hand motion for the process. U.S. Pat. No. 5,186,322 (Harreld et al) teaches an extended-length sponge retrieval glove, used by physicians to collect and count surgical sponges; the padding and finger half-webbing of the instant invention are not taught.

Mitt and bag combinations for collecting waste are known. U.S. Pat. No. 4,845,781 (Strickland et al) discloses an invertible hand mitt for collecting contaminated materials; the padding and half-webbing features of the present invention are not disclosed. U.S. Pat. No. 4,902,283 (Rojko et al) teaches an invertible mitt for wiping babies, which allows the user to avoid contact with baby waste, but does not allow manipulation of the hand and fingers to pick up waste efficiently. UK Published Patent Application No. 2 237 973A simply discloses another bag-mitt structure for collecting pet waste, with either a pull-tie or hook and loop closure for sealing the bag after use.

Gloves for retrieving noxious material or refuse are shown in U.S. Pat. No. 4,937,881 (Heise), U.S. Pat. No. 5,020,159 (Hellickson), U.S. Pat. No. 5,740,554 (Reed), U.S. Pat. No. 5,901,995 (Tuvim et al.), and French Patent 2,637,924.

Disposable gloves used for general cleaning are shown in U.S. Pat. No. 4,788,733 (Lerner), U.S. Pat. No. 4,959,881 (Murray), U.S. Pat. No. 5,020,160 (Cano), and U.S. Pat. No. 5,806,099 (Grindberg). A reusable general purpose cleaning glove is seen in U.S. Pat. No. 720,640 (Torrens), which shows a glove for washing, scrubbing and the like with a removable felt pad; the padding and half-webbing aspects of the instant invention are not seen. U.S. Pat. No. 4,677,697 (Hayes) and WO Publication 90/00357 disclose gloves dispensed from a roll.

None of the above inventions and patents, taken either singly or in combination, is seen to disclose a glove-like waste collection and disposal device having half-webbing between the fingers and thumb portions, as well as contiguous palm and finger padding, so that waste is collected without leaking about the fingers of the glove, and without imparting warmth from fresh waste to the hand of the user, all as will subsequently be described and claimed in the instant invention.

SUMMARY OF THE INVENTION

The instant invention comprises a pet waste collection and disposable device in the form of a disposable glove-like member made of thin, preferably biodegradable material (polyethylene, vinyl, latex, polypropylene, cellophane etc.). The glove is of a length to extend substantially up a user's forearm, and may be manufactured in many widths and lengths to fit a variety of users.

Webbing is provided about half way up the fingers and thumb portion of the glove, for two essential purposes: first, to prevent uncomfortable dribbling or leakage of wet waste about the fingers to the back of the glove, and second, to still permit acceptable dexterity of the user's thumb and fingers in collecting the waste.

A very thin (preferably) padding is incorporated in the inner area of the glove which defines the palm, fingers, and thumb. In a preferred embodiment, the padding (e.g., a bubble wrap-like structure) is made integrally with the glove. Other padding (e.g., cloth, non-wovens, cotton, either woven or non-woven, etc.) could be adhesively attached to the glove, if desired. The main purpose of the padding is to prevent the warmth emanating from fresh waste from passing through the glove to the hand of the user; this can be a most uncomfortable and repulsive feeling.

A quantity of identical gloves are disposed on a roll for quick and convenient dispensing. The gloves may be made in a variety of colors and patterns or prints. The gloves may also be treated to emit various fragrant scents (orange, lemon, etc.).

When utilized to retrieve pet waste, the padding on the glove protects the wearer from the unpleasant feel and temperature of the waste. The half webbing permits full dexterity in collecting the waste, yet prevents liquid waste from leaking around the fingers and thumb of the user to the back of the hand. Also, the padding on the fingers and thumb enhances the gripping function without the need of an undue amount of pressure. The glove's length improves the user's manipulative ability when the glove is to be removed and the waste confined therein as will be further explained below. Although, in its preferred embodiment, the instant invention is utilized for pet waste collection and disposal, the invention could obviously be utilized for retrieval and disposal of waste from all livestock, wild and domestic.

After the glove is used, it may be conveniently inverted by the user so that the device now becomes a disposal bag. Two integral ties are formed at the open end of the extended cuff of the glove, which are then tied together to seal the glove. Then, the glove with its enclosed waste may be disposed of in a safe and sanitary manner.

Accordingly, it is a principal object of the invention to provide a simple and efficient device for hand collection and disposal of pet waste.

It is another object of the invention to provide a device for retrieving pet waste wherein a user's hand is protected from direct contact with the pet waste.

Still another object of the invention is to provide a device for collecting pet waste including a glove-like structure with half-webbing between the fingers and thumb, which allows full use of the fingers and hands to pick up the waste, while preventing the waste from leaking around and onto the back of the hand and fingers of the user, a most obnoxious and uncomfortable feeling.

It is a further object of the invention to provide a device for retrieving pet waste wherein the device protects a user's hand from the unpleasant feel and temperature of the pet waste.

Still another object of the invention is to provide a device for retrieving pet waste wherein the device also functions as a disposal bag.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

FIG. 1B is a sectional view taken along lines 1B—1B of FIG. 1A.

Similar reference characters denote corresponding features consistently throughout the attached drawings.

DETAILED DESCRIPTION OF THE PREFERRED EMBODIMENTS

Figure 1:
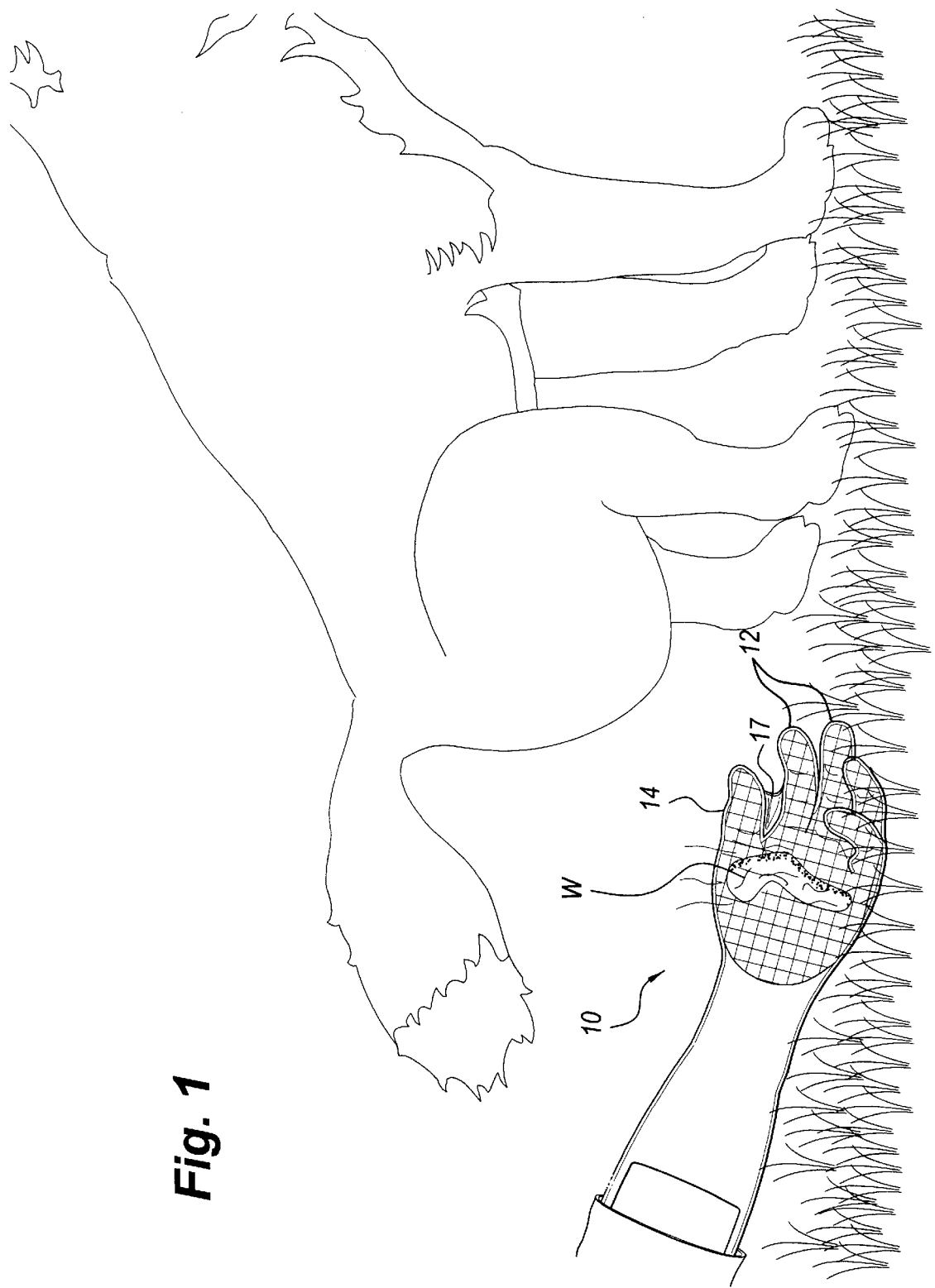
FIG. 1 is an environmental perspective view of a pet waste collection and disposal glove according to the present invention.
Figure 1A:
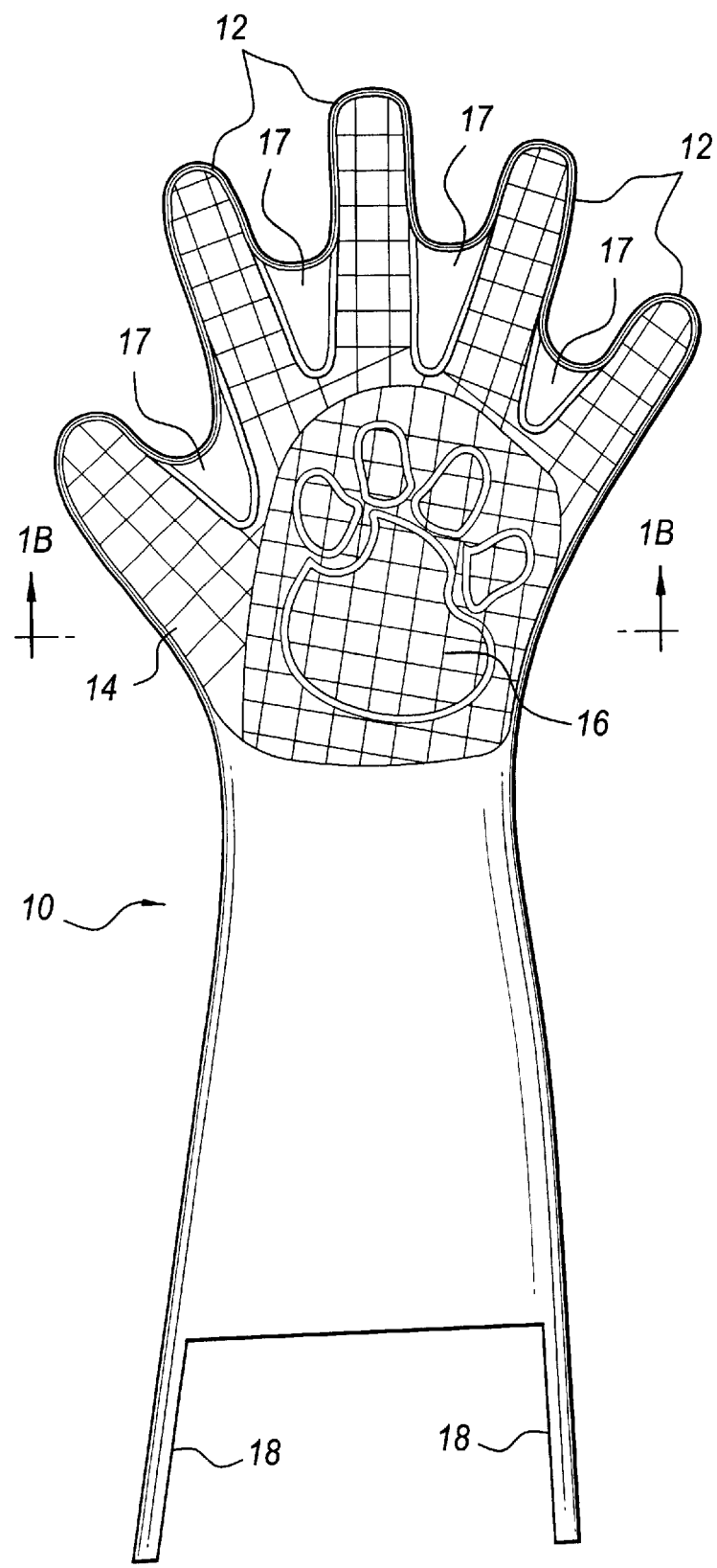
FIG. 1A is an elevational view of the pet waste collection and disposal glove.

As illustrated in FIGS. 1–6, the present invention comprises a pet waste collection and disposal glove-like device configured as a glove and generally indicated at 10. Glove 10 is provided with the customary four fingers 12 and thumb 14. As stated above, the glove is fabricated from thin, biodegradable material so that it will conform to the disposal standards that may exist in some jurisdictions. A thin, cloth padding 16 is incorporated or positioned on the fingers, thumb, and palm area. The cloth padding 16 may be fabricated from any convenient, inexpensive material, e.g., cotton. As an alternative, the padding may take on the form of conventional air bubbles as is known in the art. As stated above, the purpose of padding 16 is to protect a user's hand from the unpleasant feel and temperature of pet waste w. Padding 16 also functions to increase the frictional characteristics of glove 10 thereby enhancing the collection process. It is to be further noted here that, preferably, the padding 16 is contiguous, and covers the interior portions of the fingers, thumb and palm areas, all the way down to the base of the palm, as is clearly seen in FIG. 1B.

Another significant feature of the invention is the provision of half-webbing 17 between the fingers 12 and thumb 14 of the glove. Half-webbing as opposed to full webbing known in the art is preferred, because the user may manipulate his or her fingers with full dexterity in collecting the pet waste. By "half-webbing" I mean the webbing extends only midway up the finger and thumb portions of the device, and not all the way to the ends, as is the case in some known collection gloves. Equally importantly, the half-webbing 17 prevents any liquid oozing from the waste from escaping around the user's fingers and onto the back of the glove, over the back of the user's hands, which is a most uncomfortable and obnoxious sensation or feeling. The deficiency of prior art devices to provide such protection may explain why so few pet collection glove-like devices are in circulation and use.

Figure 2:
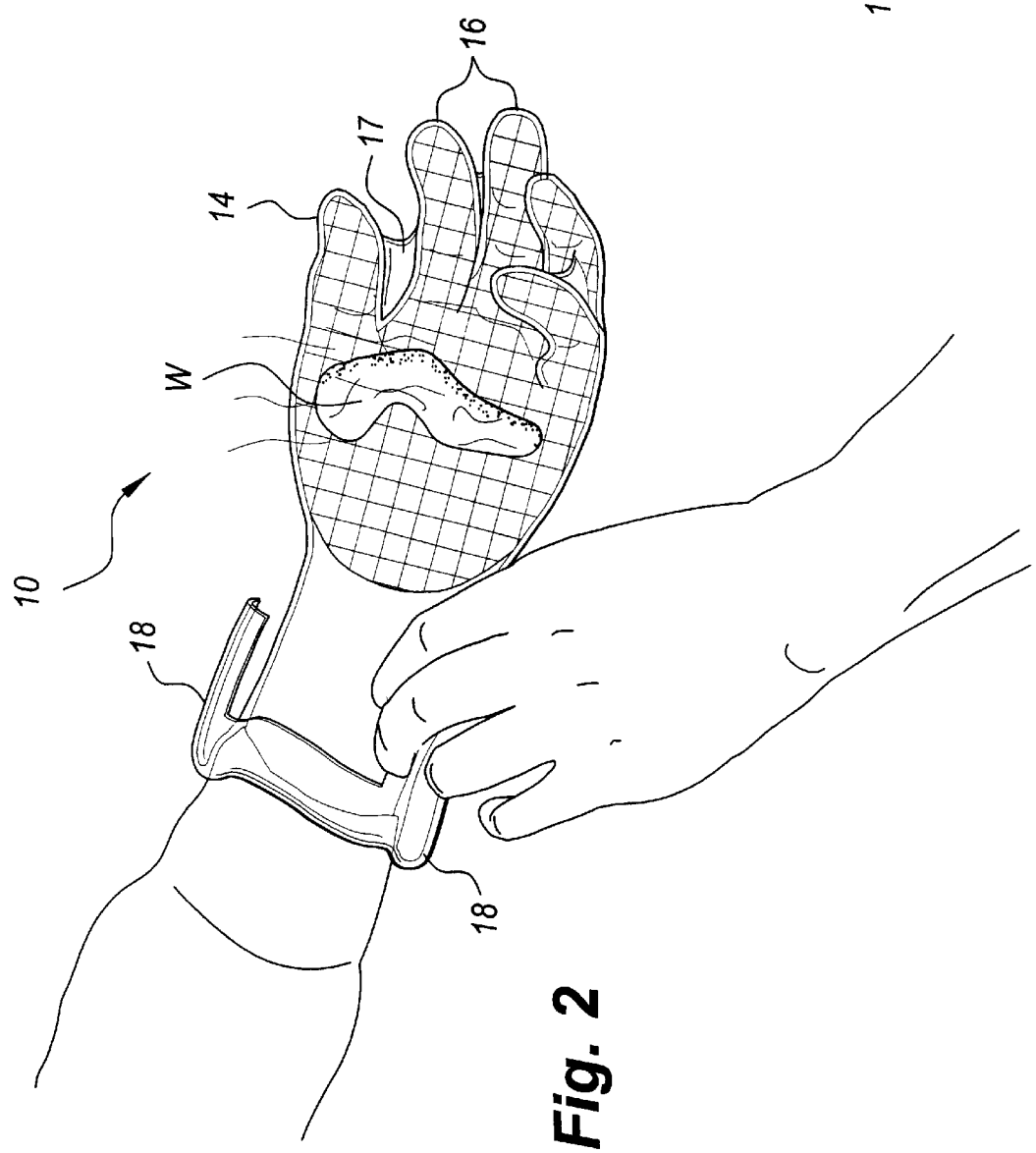
FIG. 2 is an environmental perspective view of the pet waste collection and disposal glove being removed from a user's hand.

As best seen in FIG. 1, glove 10 is elongated so as to extend approximately midway the forearm of a user. It has been found that a glove length of about twenty-one inches will be adequate for the normal user. In addition to providing protection for the user's arm, the extra length makes manipulation easier when glove 10 is removed as shown in FIG. 2. A pair of ties 18 are provided at the end of glove 10. Ties are integral with the device, in a preferred embodiment, and are structured and function much in the same way as ties formed on trash bags.

Figure 4:
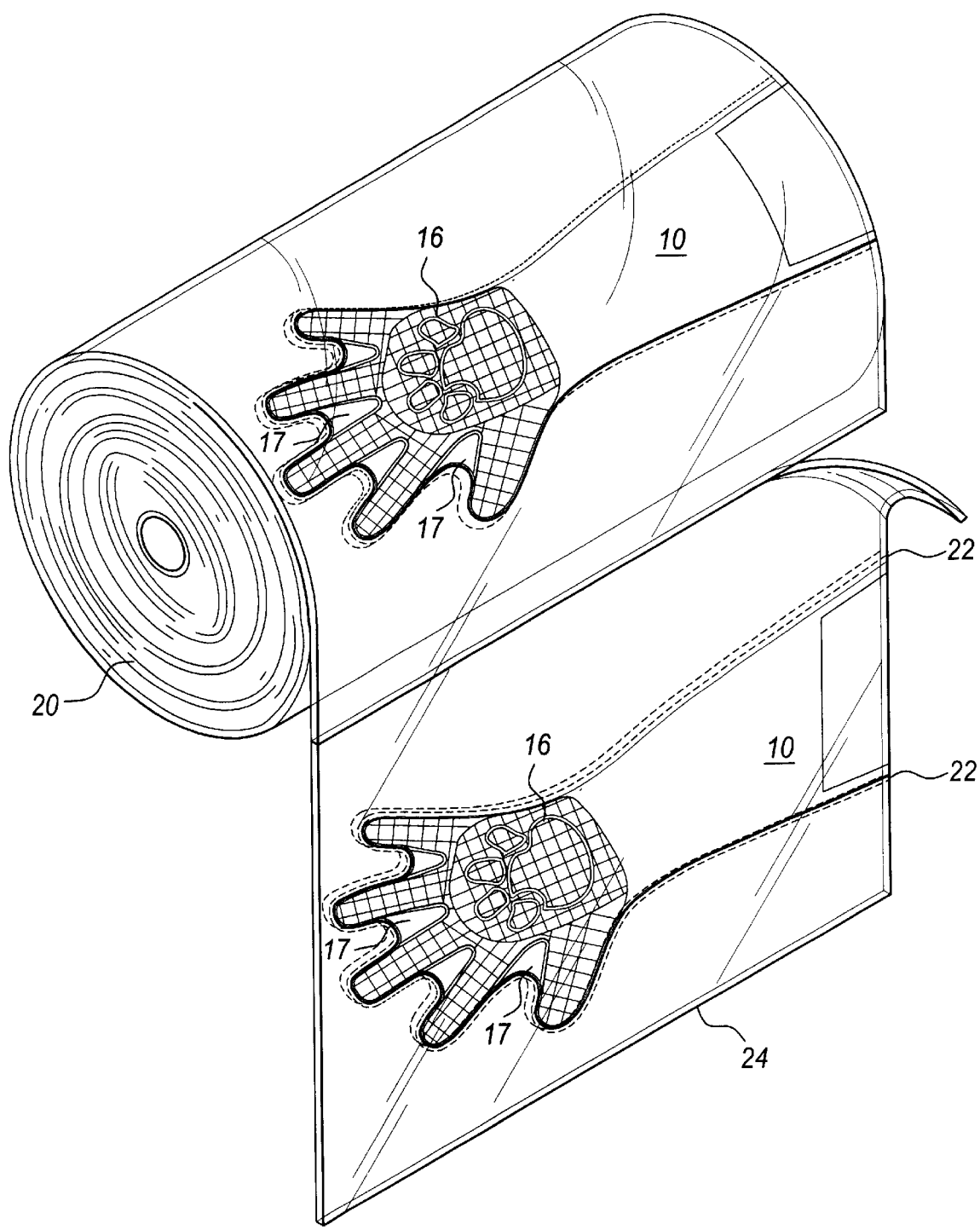
FIG. 4 is a perspective view showing one example of a pet waste collection and disposal glove incorporated on a dispensing roll according to the present invention.
Figure 5:
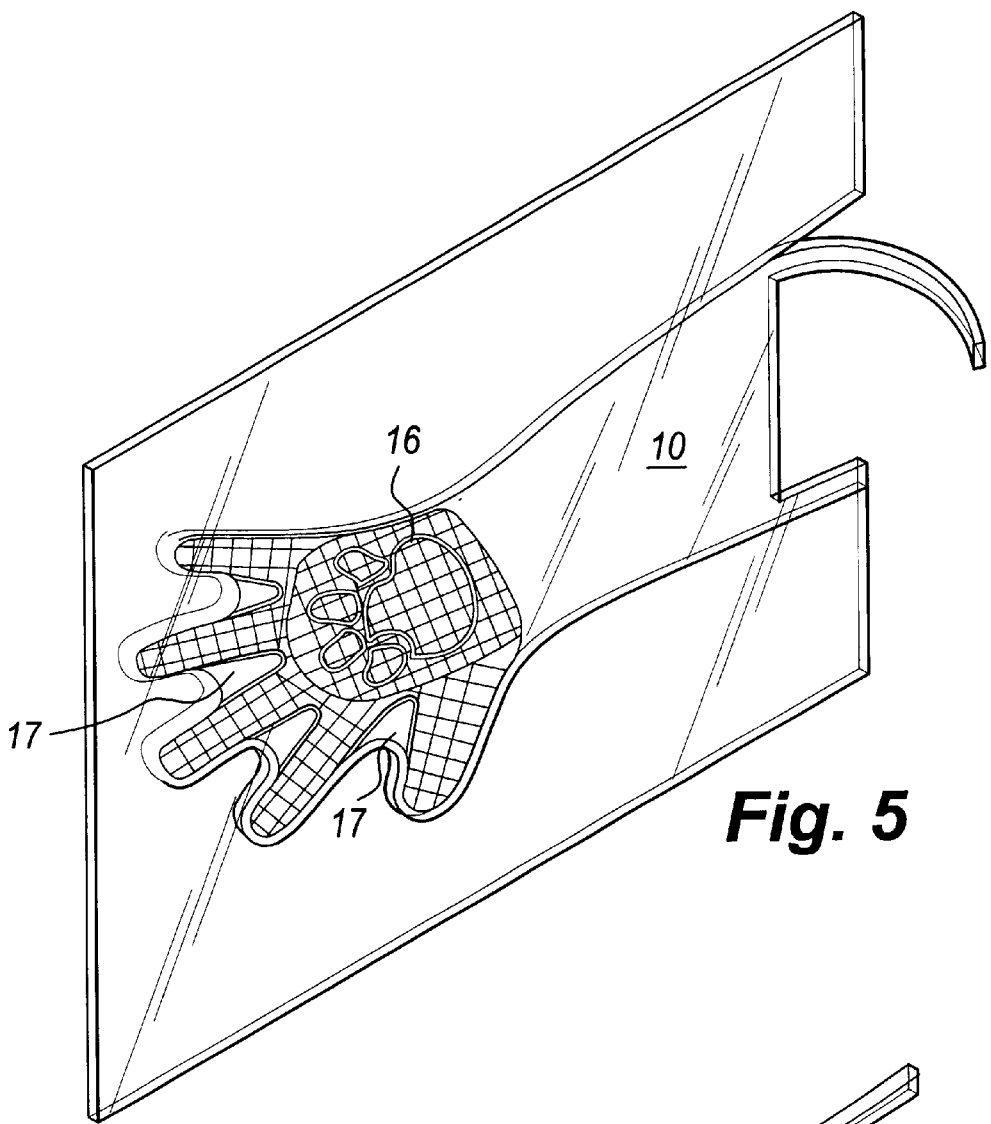
FIG. 5 is a perspective view of a sheet removed from the dispensing roll.
Figure 6:
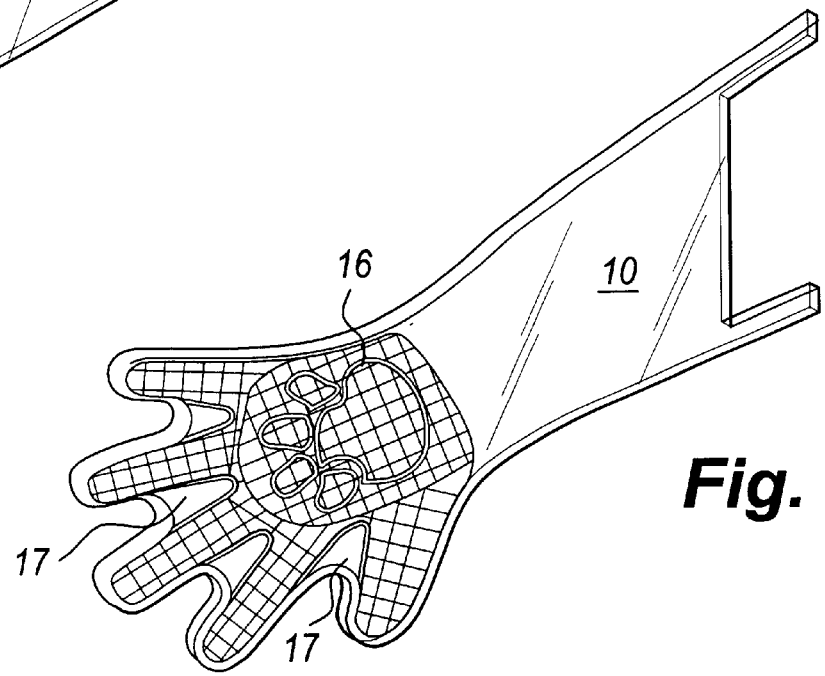
FIG. 6 is a perspective view of the pet waste removal glove removed from the sheet.

Attention is now directed to FIG. 4 wherein glove 10 is shown incorporated in a dispensing roll 20. Roll 20 is perforated at 22 so that a glove sheet 24 may be easily removed from roll 20 when needed. Perforations are formed in the sheet around the outline of the glove so that the glove may easily be separated from the sheet (FIGS. 5 and 6). In a preferred embodiment, gloves are formed separately and folded into a box container for dispensing, much in the same fashion as boxed sandwich bags, trash bags, etc. In another embodiment, the glove might be adhered to a carrier sheet by a tack-adhesive and simply removed from the sheet for use. The sheets with gloves would be rolled into a dispensing roll. In yet another embodiment, a dispensing roll would be made up of gloves only, adjacent gloves reversed with respect to one another at separation lines, so that the glove to be used would be easily separated from its adjacent glove and thus the rest of the roll.

Figure 3:
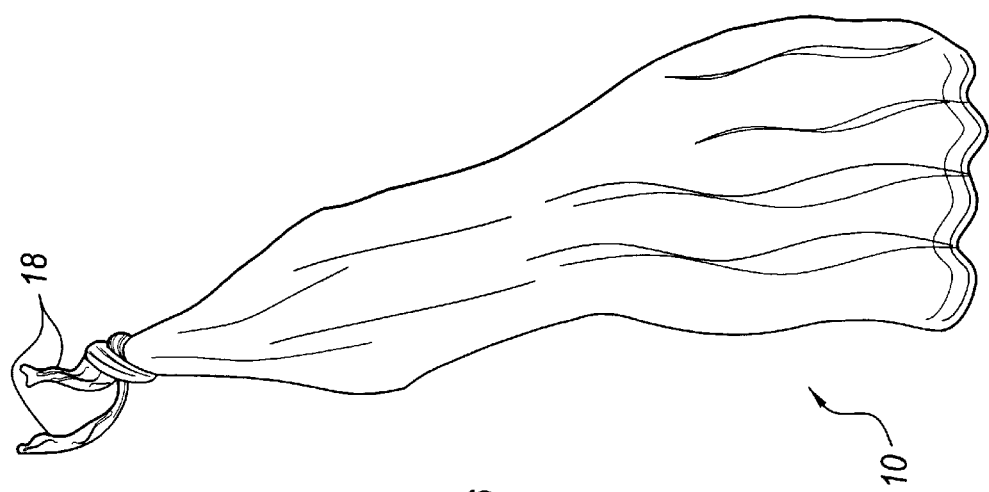
FIG. 3 is an environmental perspective view of the pet waste collection and disposal glove utilized as a disposable bag according to the present invention.

Utilizing the present invention is fast and easy. A glove sheet 24 is removed from dispensing roll 20. A glove is then torn away from sheet 24. The user inserts his/her hand into the glove to retrieve pet waste w (FIG. 1). After retrieving the waste, the user's free hand is then employed to turn the glove inside out (FIG. 2). The inverted glove now becomes a disposable bag with the waste w contained inside. Ties 18 are used to seal the everted glove into a disposal bag (FIG. 3).

Is It is to be understood that the present invention is not limited to the embodiments described above, but encompasses any and all embodiments within the scope of the following claims.

I claim:

1. A pet waste collection and disposal device comprising:
   a glove-like member fabricated from biodegradable material, said glove-like member having outer and inner surfaces;
   four fingers, a thumb, and a palm area formed as a first end of said glove-like member;
   half-webbing between the four fingers and the thumb, whereby pet waste may be grasped without leaking out between the fingers while dexterity of a user's fingers is maintained;
   an elongated arm portion formed as a second end of said glove-like member, said elongated arm portion having an opening therein; and
   contiguous padding disposed on the inner surface of said glove-like member at said first end, said padding disposed to cover the inner surface of said four fingers, the inner surface of said thumb, and the inner surface of said palm area.

2. The pet waste collection and disposal device as defined in claim 1, wherein said glove-like member has an overall length of approximately twenty-one inches.

3. The pet waste collection and disposal device as defined in claim 2, wherein integral tie members are formed on said elongated arm portion at said opening.

4. The pet waste collection and disposal device as defined in claim 3, wherein said glove-like member is treated with a fragrant scent emitting material.

5. The pet waste collection and disposal device as defined in claim 4, wherein said padding is adhesively fixed to the inner surface.

6. The pet waste collection and disposal device as defined in claim 5, wherein said padding is fabricated from a non-woven material.

7. The pet waste collection and disposal device as defined in claim 5, wherein said padding is fabricated from cloth.

8. The pet waste collection and disposal device as defined in claim 7, wherein said padding comprises air bubbles incorporated in said glove-like member.

* * * * *